US010261332B1

(12) United States Patent
Hebert

(10) Patent No.: US 10,261,332 B1
(45) Date of Patent: Apr. 16, 2019

(54) EYEPIECE LENS WITH PROTECTED FRESNEL AND DIFFRACTIVE SURFACES

(71) Applicant: Raymond T. Hebert, Florence, OR (US)

(72) Inventor: Raymond T. Hebert, Florence, OR (US)

(*) Notice: Subject to any disclaimer, the term of this patent is extended or adjusted under 35 U.S.C. 154(b) by 65 days.

(21) Appl. No.: 15/460,041

(22) Filed: Mar. 15, 2017

Related U.S. Application Data

(60) Provisional application No. 62/308,752, filed on Mar. 15, 2016.

(51) Int. Cl.
| | |
|---|---|
| *G02B 5/18* | (2006.01) |
| *G02B 27/42* | (2006.01) |
| *G02B 25/00* | (2006.01) |
| *G02B 3/08* | (2006.01) |

(52) U.S. Cl.
CPC ............ *G02B 27/4211* (2013.01); *G02B 3/08* (2013.01); *G02B 5/1876* (2013.01); *G02B 25/001* (2013.01)

(58) Field of Classification Search
CPC .............. G02B 5/18; G02B 2005/1804; G02B 5/1814; G02B 5/1842; G02B 5/1866; G02B 5/1876; G02B 5/189; G02B 5/1895; G02B 9/04; G02B 9/00; G02B 27/42; G02B 27/4205; G02B 27/4211; G02B 27/4216; G02B 27/4272; G02B 27/4277; G02B 27/4288; G02B 27/44
USPC ....... 359/558, 565, 566, 569, 570, 571, 573, 359/574, 737, 741, 742, 743, 754, 793, 359/796
See application file for complete search history.

(56) References Cited

U.S. PATENT DOCUMENTS

| | | | |
|---|---|---|---|
| 4,212,209 A | 7/1980 | Newbold et al. | |
| 5,151,823 A | 9/1992 | Chen | |
| 5,161,057 A | 9/1992 | Johnson | |
| 5,347,400 A | 9/1994 | Hunter | |
| 5,568,324 A * | 10/1996 | Nelson | G03B 21/132 |
| | | | 359/742 |
| 5,619,373 A * | 4/1997 | Meyerhofer | G02B 27/0037 |
| | | | 345/7 |

(Continued)

OTHER PUBLICATIONS

Arthur Davis et al. "Optical Design using Fresnel Lenses, Basic Principles and some Practical Examples," Optik & Photonic, Dec. 2007 No. 4, pp. 52-55.

(Continued)

*Primary Examiner* — Arnel C Lavarias
(74) *Attorney, Agent, or Firm* — Birdwell & Janke, LLP

(57) ABSTRACT

An eyepiece lens with protected Fresnel and diffractive surfaces. An eyepiece is provided with a first element having an optical axis and a diffractive structure comprising a plurality of diffraction facets formed on at least one surface of a first element, and a second element having a Fresnel structure comprising a plurality of Fresnel facets formed on at least one surface thereof, the respective draft angles of the Fresnel facets relative to the optical axis being proximate the respective incidence angles of their respective adjacent incident light rays of a nominal design so as to minimize light obscuration and scatter, the first element and the second element having essentially the same optical axis, the diffractive surface of the first element being adapted to compensate for chromatic dispersion introduced by the refractive properties of said first and second elements.

21 Claims, 10 Drawing Sheets

(56) References Cited

U.S. PATENT DOCUMENTS

| | | | |
|---|---|---|---|
| 5,926,318 A | 7/1999 | Hebert | |
| 6,055,100 A * | 4/2000 | Kirk | G02B 27/2292 |
| | | | 353/38 |
| 6,972,735 B2 | 12/2005 | Hebert | |
| 7,053,865 B2 * | 5/2006 | Takahashi | G02B 27/225 |
| | | | 345/7 |

OTHER PUBLICATIONS

Michael D. Missig et al., "Diffractive optics applied to eyepiece design," Applied Optics, vol. 34, No. 14, May 10, 1995, pp. 2452-2461.

Optenso Optical Engineering Software; "OpTaliX(R) Software for Optical Design and Thin Films," Tutorial Version 6.50, Jun. 11, 2006.

Dean Faklis et al., "Spectral properties of multiorder diffractive lenses," Applied Optics, vol. 34, No. 14, May 10, 1995, pp. 2462-2468.

Arthur Davis et al. "Optical Design using Fresnel Lenses, Basic principles and some practical examples." Dec. 2007.

\* cited by examiner

EYEPIECE LENS WITH PROTECTED FRESNEL AND DIFFRACTIVE SURFACES

CROSS REFERENCE TO RELATED APPLICATION

This application claims priority under 35 U.S.C. § 120 to U.S. Provisional Patent Application No. 62/308,752, filed Mar. 15, 2016, which is hereby incorporated in the present application in its entirety pursuant to 37 CFR § 1.78.

FIELD

The present invention relates to the field of eyepiece lenses for head-mounted and virtual reality displays. More specifically, the invention addresses the design of a compact doublet eyepiece lens having internal Fresnel and diffractive surfaces which provide achromatic performance and are protected from the user's environment.

BACKGROUND

Head-mounted and heads-up display products have been created and marketed for decades. Early versions used image sources such as cathode ray tubes, which evolved to include liquid crystal displays ("LCD") and organic light emitting diode displays ("OLED"). The eyepiece optics evolved from single and multi-element glass spherical lenses to low-cost, lightweight aspheric plastic lenses.

With the advent of smartphone displays having high pixel densities in the range of 300 to 600 pixels per inch over diagonal screen sizes of 4 inches or larger, it is possible to display reasonably high resolution graphic and video content in a split-screen, landscape mode (side-by-side) format such that a common image or half of a 3D stereo pair is presented to each of the viewer's eyes. With appropriate optics and viewing geometries, video content meeting the 720P video standards or better can be achieved with a premium smartphone and appropriate optics. Visual fields of view in excess of 70 degrees diagonal can be achieved, which is equivalent to viewing a 50 inch TV monitor from a distance of 3 feet or less. So the viewing experience can be fairly immersive. To meet the market demands of such products, the lenses have to be compact, lightweight, inexpensive and high-performance. Such demands are not simultaneously achieved by conventional optical designs.

There are many viewer products presently addressing this market, such as Google Cardboard, a virtual reality platform developed by Google for use with a head mount for a smartphone, which incorporates a fold-out cardboard viewer; Oculus Rift, a virtual reality headset developed and manufactured by Oculus VR; Samsung Gear VR, a mobile virtual reality headset developed by Samsung Electronics; and many others. The eyepiece optics in such products range in visual quality from very poor to very good. In general, they strive for a wide field of view for an immersive visual experience. Some products strive for low-distortion optics design while others use compensating software predistortion to compensate for the lens deficiencies. Some products use thinner, lightweight, low-cost Fresnel lenses. However, most ignore chromatic aberation, resulting in color separation that increases with field of view. This is detrimental to resolution of fine detail, especially small text.

In general, use of diffractive optics in imaging optics to achieve chromatic correction, including combining such diffractive optic surfaces with refractive optics, can be found in the prior art. Characteristics of some such optical systems are summarized in Missig and Morris, "Diffractive Optics Applied to Eyepiece Design" (Applied Optics, Vol. 34, No. 14, 10 May 1995), with numerous historical references. Such techniques have previously been used in the development of numerous products for Kopin Corporation of Westborough Mass.

For example, Chen U.S. Pat. No. 5,151,823 discloses a three element binocular eyepiece having a diffractive surface etched onto a lens surface facing the object needing magnification and a four element lens having a diffractive surface etched onto the third element from the entrance pupil. Chen also discloses a Fresnel lens element having a multi-level diffractive optic structure disposed thereon. As another example, Johnson U.S. Pat. No. 5,161,057 addresses a dispersion-compensated lens for solar concentration wherein diffractive surface structures are superimposed on a Fresnel groove structure for chromatic correction. Such combined Fresnel-diffractive surfaces are not well suited to visual imaging applications as diffractive features and Fresnel features can chromatically interfere with one another.

Also, the combination Fresnel and described low-diffractive Fresnel is discussed and claimed in Hunter U.S. Pat. No. 5,347,400 for a virtual reality helmet. However, this patent does not disclose or claim the combination for chromatic correction; rather it is directed to minimizing Moire' fringing interference between surfaces and to optimizing off-axis visual quality with a wide field of view.

A diffractive-Fresnel combination is also disclosed in Hebert U.S. Pat. No. 5,926,318 as applied to a biocular micro display head-mounted system; that is, a single image source is relayed to both eyes. Conceptual configurations are illustrated in FIG. 2 thereof, using a constant groove depth Fresnel, and disclosed as part of a claimed biocular viewing system in claims 14 through 23. However, constant groove depth Fresnels in combination with diffractive surfaces have proven to be problematic in that they can create unwanted chromatic artifacts. Microdisplay products are generally sealed between the display and eyepiece, therefore do not require two-sided Fresnel and diffractive surface protection from the user environment FIG. 1 depicts a series of lens designs that illustrate the evolving advantages of various lens architectures. All are shown with display screen 1 on the left at the object plane imaged by various lens configurations through eye pupil 3 and eye lens 2 onto retina 4. Respective on-axis bundles 5a, 5b and 5c and peripheral ray bundles 6a, 6b and 6c are shown along with their corresponding on-axis spot diagrams 7a, 7b and 7c and peripheral spot diagrams 8a, 8b and 8c, and overall geometric distortion plots 9a, 9b and 9c.

This series of example designs, while not intended to be exclusive, is illustrative of known lens architectures applied to viewing optics for a smartphone having a 5-inch diagonal display in a side-by-side binocular viewing mode. As such, one-half of the effective display screen 1 is approximately 28 mm×31 mm. All are designed with an effective focal length 10 of approximately 58 mm and an eye relief 9 of 25 mm to accommodate clearance for the user's prescription eyewear. The resultant diagonal field of view 13 is in excess of 70 degrees. An appropriate lens design will be capable of resolving a single pixel on the smartphone screen clearly over the entire field of view. A reference pixel 11 is shown on the spot size diagrams relative to the scale bar 12. This is illustrative of a 58 microns square smartphone screen pixel as perfectly imaged onto the retina, i.e., an effective image size of approximately 12 microns square.

FIG. 1A illustrates the performance of a prior art singlet glass lens 14a having spherical surfaces. Having very large geometric and chromatic aberrations, lens 14a is clearly not capable of resolving single pixels.

FIG. 1B illustrates performance of a prior art plastic lens 14b with dual aspheric surfaces. It offers significant improvements over simple glass lens 14a, but with significant geometric and chromatic aberrations it still lacks sufficient resolution to resolve peripheral rays 6b. Additionally, with a center thickness of 12.5 mm this would be an expensive lens to injection mold. Such designs are quite effective in a smaller format as used for lesser fields of view and/or smaller eye relief distances and are particularly effective in such less demanding applications when one surface includes diffractive features for chromatic correction. However, such designs are used in a number of products utilizing electronic micro displays, but are not well suited for large-field, large display products such as smartphones due to required lens thickness, weight, cost and inferior off-axis performance.

FIG. 1C illustrates the performance of a prior art lens doublet design including a continuous-profile Fresnel lens 15 on a planar substrate in conjunction with an aspheric corrector lens 16. Aside from its chromatic aberration, its performance is very good; that is, it capable of sharply resolving monochromatic pixels on a black background over the full field of view. However, this is insufficient, for example, for sharply resolving black text on a white background at the periphery of the field of view. Such text would rainbow with reduced contrast.

SUMMARY

To overcome the limitations of previous eyelenses, particularly those used with head-mounted and virtual reality displays, an eyepiece is provided with a first element having an optical axis and a diffractive structure comprising a plurality of diffraction facets formed on at least one surface thereof, and a second element having a Fresnel structure comprising a plurality of Fresnel facets formed on at least one surface thereof, the respective draft angles of the Fresnel facets relative to the optical axis being proximate the respective incidence angles of their respective adjacent incident light rays of a nominal design so as to minimize light obscuration and scatter, the first element and the second element having essentially the same optical axis, the diffractive surface of the first element being adapted to compensate for chromatic dispersion introduced by the refractive properties of said first and second elements.

Preferably the plurality of Fresnel facets have a constant pitch but variable depth in the axial direction, lie within the nominal minimum width of the pupil of a human eye, and are aspherically curved, one surface of the second element being aspheric and having the Fresnel structure superimposed thereon.

Preferably the diffractive structure comprises a plurality of diffraction facets having variable widths in the radial direction and a constant depth in the axial direction superimposed on the one surface of the first element so as to achieve selected facet-to-facet phase relationships. Preferably the individual diffraction facets are curved and depths are selected in accordance with first-order diffraction theory. Preferably the surface bearing the diffractive structure is itself curved.

Further preferably tone surface of said second element is curved, the Fresnel structure is superimposed on that surface, and the individual Fresnel facets have a constant pitch but variable depth in the axial direction.

It is also preferred that the diffractive surface of the first element faces said Fresnel surface of the second element, and that the space between Fresnel surface and the diffractive surface be isolated from the user environment.

It is to be understood that this summary is provided as a means of generally determining what follows in the drawings and detailed description, and it is not intended to limit the scope of the invention. Objects, features and advantages of the invention will be readily understood upon consideration of the following detailed description taken in conjunction with the accompanying drawings.

DETAILED DESCRIPTION OF A PREFERRED EMBODIMENT

A purpose of the present invention is to provide superior visual performance in an eyepiece for large-format displays as used in smartphones, though the invention may be used in other contexts without departing from the principles the invention.

To achieve the aforementioned purpose, a preferred embodiment of an eyepiece lens according to the present invention comprises an achromatic air spaced doublet comprising an extended Fresnel lens element having a Fresnel structure superimposed on a curved refractive surface to achieve high refractive power with a compact and relatively light weight element, and another lens element having a diffractive structure superimposed on a curved refractive surface to correct for chromatic aberration introduced by the refractive properties of the first and second lens elements. Because in the preferred embodiment the lens having the diffractive structure actually receives light rays from an object and propagates those rays toward the lens having the Fresnel structure, the lens having the diffractive structure is referred to herein as the first lens element, or first element, and the lens having the Fresnel structure is referred to as the second lens element, or second element.

Preferably, the diffractive structure for chromatic correction is disposed on the inside surface of the first lens element and faces a continuous-profile constant-pitch Fresnel structure disposed on the inside surface of the second lens element such that the diffractive and the Fresnel surfaces face one another and are isolated from the user environment.

Figure 1A:
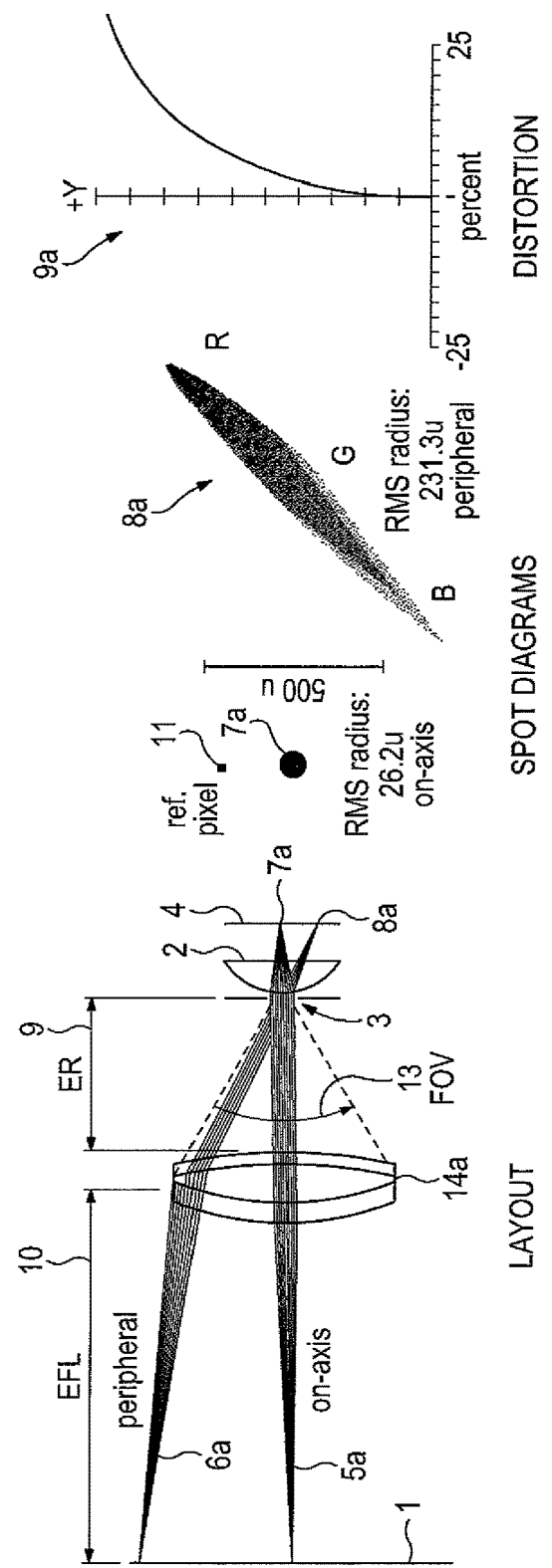
FIG. 1A illustrates the relative on-axis and off-axis performance limitations of a prior art spherical surface lens eyepiece.
Figure 1B:
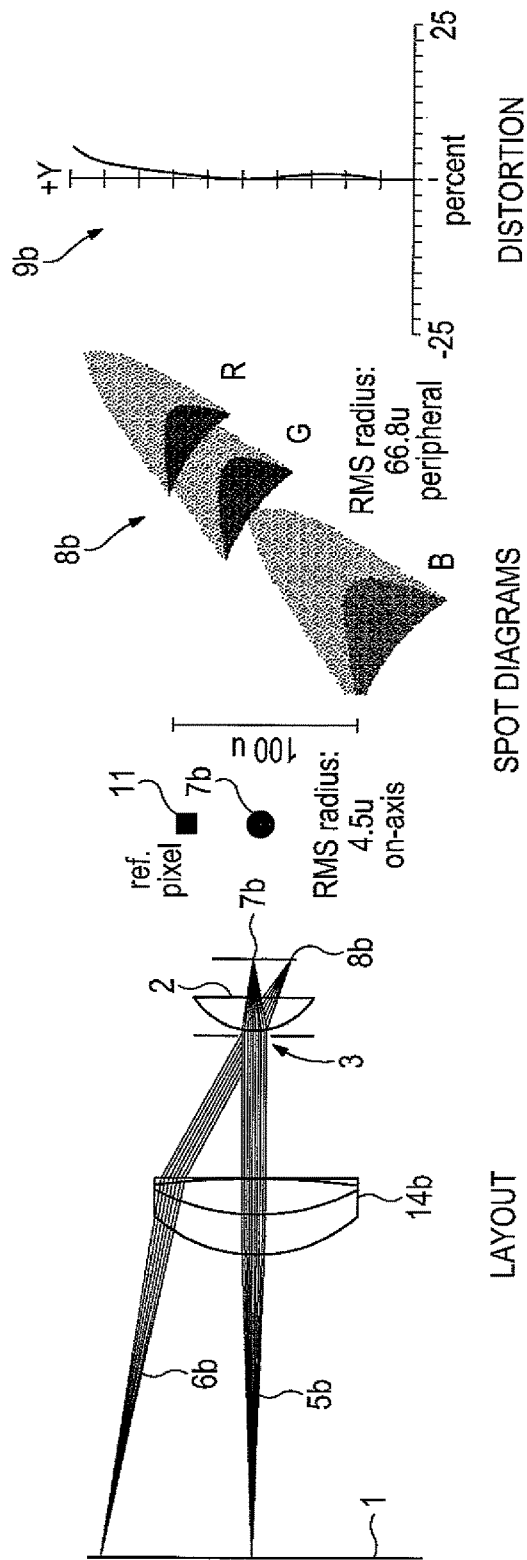
FIG. 1B illustrates the relative on-axis and off-axis performance limitations of a prior art aspherical surface lens eyepiece.
Figure 1C:
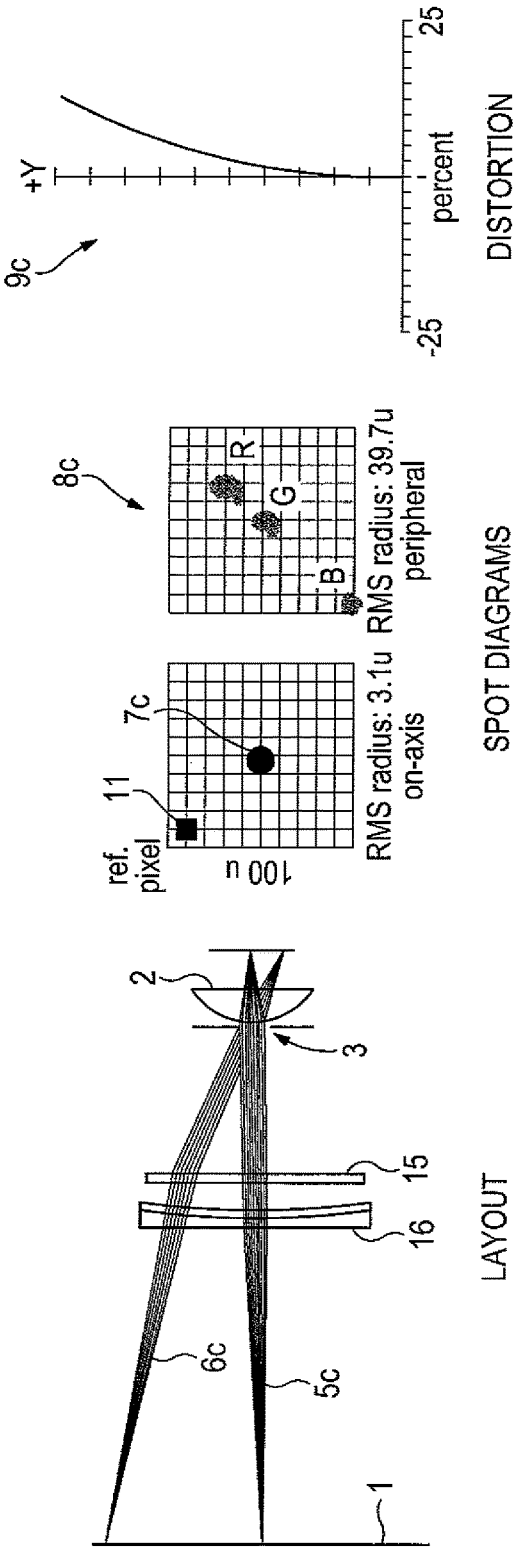
FIG. 1C illustrates the relative on-axis and off-axis performance limitations of a prior art Fresnel lens eyepiece.
Figure 1D:
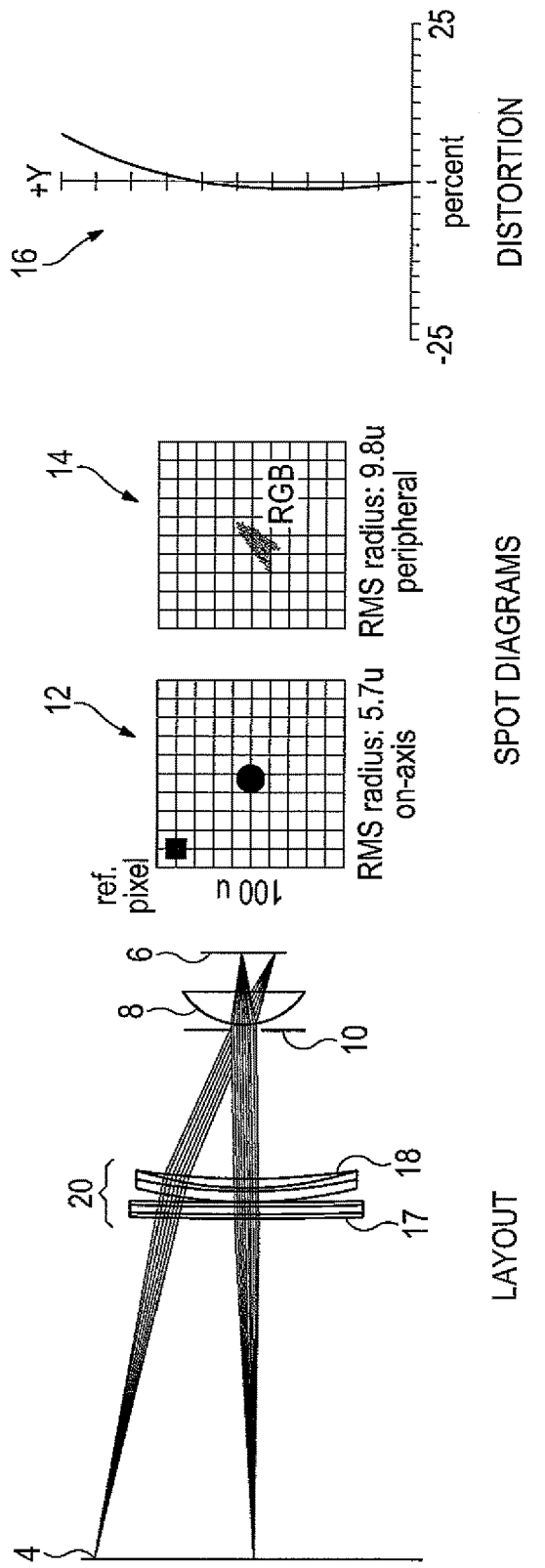
FIG. 1D illustrates the relative on-axis and off-axis performance limitations of an achromatic doublet according to the present invention having a first spherical or aspherical refractive element on which a diffractive structure is superimposed and a second spherical or aspherical refractive element on which a Fresnel structure is superimposed, the diffractive and Fresnel structures facing one another.

A general illustration of an eyepiece doublet 20 for a smart phone viewer according to the present invention is shown in FIG. 1D, which shows the layout of the doublet 20; an object plane 4; an image plane 6; i.e., the retina of the viewer, the eye lens 8 of the viewer, and the iris aperture 10 of the viewer, ignoring the cornea of the viewer for simplicity. The doublet 20 comprises a corrector lens 17 having a diffractive structure superimposed on a refractive surface for chromatic correction followed by a continuous-profile Fresnel structure superimposed on an extended refractive substrate 18. Fresnel lens 18 provides optical power based on geometric refractive path lengths while the diffractive corrector lens 17 provides diffractive power based on phase modulation. The design balances the chromatic dispersion of the refractive properties of both the first and second lens elements with nearly equal and opposite chromatic dispersion. FIG. 1D also includes representative examples of on-axis spot diagram 12, a peripheral spot diagram 14, and a distortion curve 16.

In addition, the diffractive and Fresnel surfaces, which are relatively delicate, are disposed on the respective inside refractive surfaces isolated from the user environment to protect them from ambient damage. Compared to known prior art eyepiece lenses applicable to head-mounted and virtual reality displays performance of this embodiment is excellent over the entire field of view.

Figure 2:
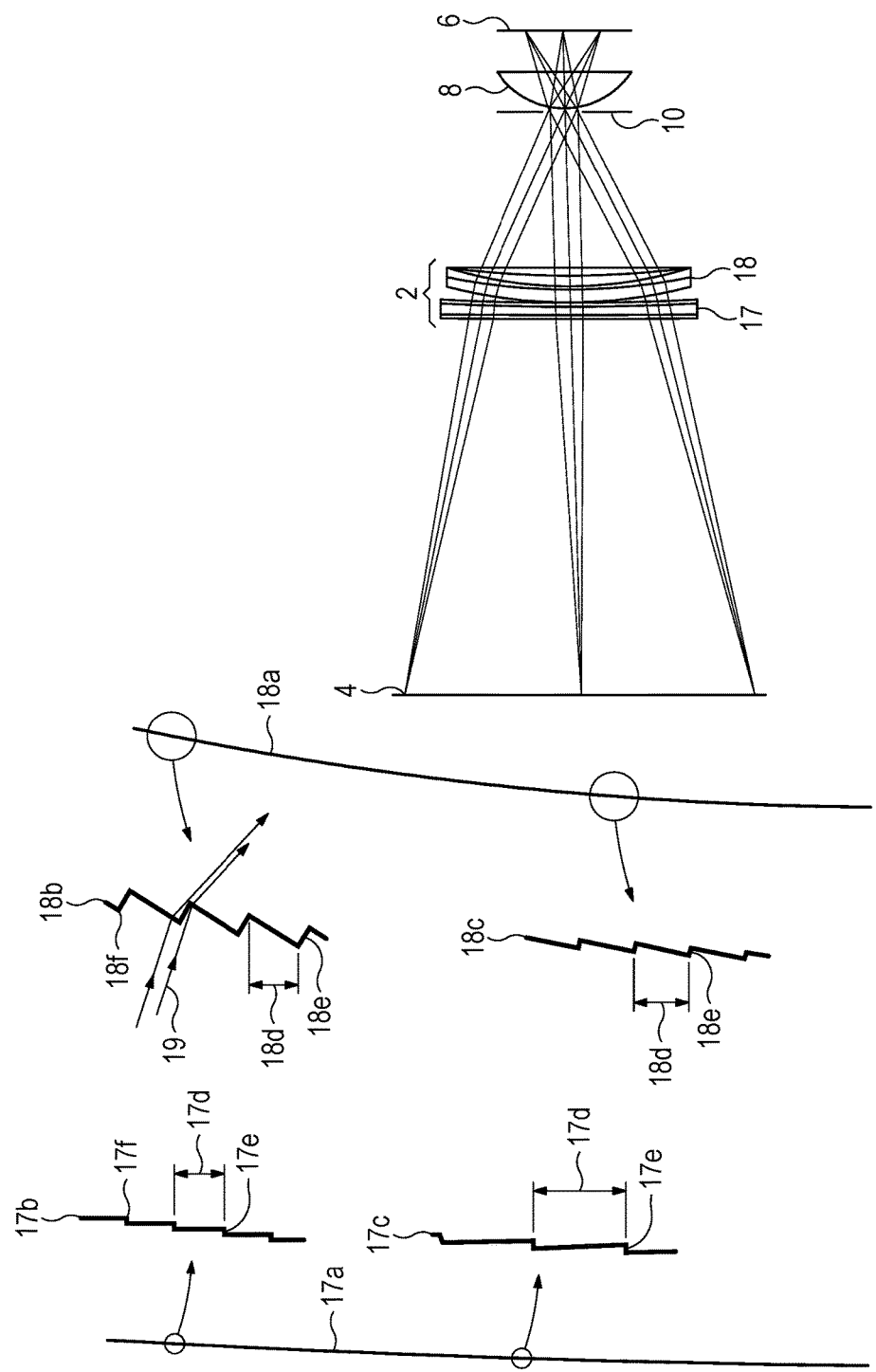
FIG. 2 illustrates the structural details of the diffractive and continuous profile, constant pitch Fresnel structures in relation to the eye pupil and eye lens of a viewer according to the principals of the present invention.

FIG. 2 shows a blow up 17b at a first, upper location on the inside, diffractive surface structure 17a of the first doublet element 17 and a blow up 17c at a second, midfield location on the inside surface 17a of the first doublet element 17. FIG. 2 shows a blow up 18b at a first, upper location on the inside, Fresnel surface structure 18a of the second doublet element 18 and a blow up 18c at a second, mid-field location on the inside surface 18a of the second doublet element 18.

The Fresnel structure is a constant facet width, variable depth design as illustrated in details 18a through 18f. The peaks 18f of profile 18a follow the base profile sag of the design which may be plano, spherical or aspheric. Spherical or aspheric profiles define this as an extended Fresnel surface. The Fresnel details of 18b and 18c that are superimposed on the base profile sag follow the Fresnel profile sag of the design which may be spherical or aspheric.

Both the base profile sag and the Fresnel profile sag are defined by equations of the form, $$z = \frac{cr^2}{1 + \sqrt{1 - (1+k)c^2 r^2}} + \sum_{i=0}^{n} \alpha_i r^{2i}$$

where z is the surface sag as a function of radial distance r from the optical axis of the lens element. The surface is plano if curvature c=0 and higher-order parameters α=0. The surface is spherical if conic constant k=0 and higher-order parameters α=0, and is otherwise aspheric. All parameters may be adjusted to optimize the performance of the design. The Fresnel sag equation in conjunction with the defined constant facet width and draft angles determines the variable groove depth 18e. The draft angles are variable as a function of radial distance r from the optical axis of the lens element and are chosen to minimize the obscuration of incident and exiting rays directed toward the eye pupil 3, thereby minimizing scatter and glare. The constant-width Fresnel lens facets 18d are large enough to be seen by the naked eye when observed independently, but small enough that several reside within the projected diameter of eye pupil 3 so as to be undetectable in use. While the Fresnel facets appear in the FIG. 2 to be plano, they are actually small curved segments of the combined base and Fresnel sags in order to optimize resolution of image detail finer than the facet width. This is a referred to as a continuous-profile Fresnel lens design.

As nearly all optical materials exhibit decreasing index of refraction with increasing wavelength, chromatic dispersion results in chromatic aberrations, as illustrated in FIG. 1a through FIG. 1c. To counter this in the present invention, extended Fresnel lens element 18 is preceded in the light path by corrector lens element 17 which incorporates a diffractive surface 17a on its right-hand surface. Such diffractive surfaces exhibit increasing diffraction with increasing wavelength. Using that characteristic a lens design according to the invention substantially neutralizes the overall chromatic dispersion, thereby minimizing the chromatic aberrations.

Figure 3:
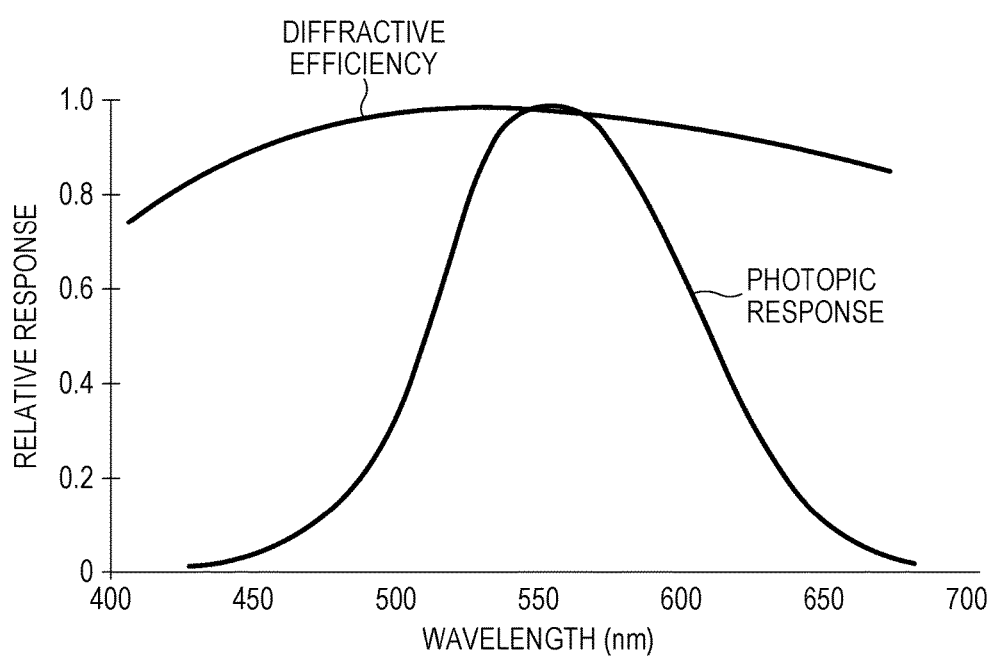
FIG. 3 shows the wavelength centering for best efficiency of the diffractive surface structure according to the principals of the present invention.

The diffractive structure is a variable facet width, constant depth design as illustrated in details 17a through 17f. Diffractive profile 17a is a blow-up of the upper half of the right-hand surface of diffractive corrector lens 17. Expanded detail 17b is a close-up of details at the periphery of the diffractive profile 17a while expanded detail 17c is a close-up mid-field on profile 17a. The peaks 17f of profile 17a follow the base profile sag of the design which may be piano, spherical or aspheric; as defined by the above sag equation. Additionally, a first-order diffractive phase factor is added to the base profile 17a as defined by the following equation:

$$\Phi = \sum_{i=1}^{n} A_i r^{2i}$$

where ϕ is phase shift in radians as a function of radial distance r. Parameters A are adjusted to balance out the chromatic aberrations of refractive properties of the first and second lens elements. Groove depth 17e is specified to create a phase shift of 2π radians in optical path lengths between the air side and the glass or plastic sides of the groove depth cut. This is converted to a physical depth according to the equation;

$$\Delta z = \lambda / \Delta N$$

where λ is the optimization wavelength and ΔN is the difference in index of refraction of the materials on each side of the groove depth 17e, e.g., plastic and air. Since the efficiency of a first-order diffractive surface falls off to either side of the optimization wavelength, λ is chosen to balance the inefficiencies at the blue and red ends of the human eye's photopic, i.e., daylight, response, as illustrated in FIG. 3. For the example of FIG. 1d, the groove depth 17e is 0.985 micron for the optical material of choice. The draft angles are chosen to facilitate ejection from injection mold tooling; typically about 2 degrees. The diffractive facets 17d are too small to be seen by the naked eye when observed independently, but a rainbow effect on transmitted and reflected light will verify their presence. While the diffractive facets appear to be piano, they are actually small curved segments of the combined base and diffractive sags.

While the preferred embodiment disclosed herein uses a single depth diffractive structure, a multiple depth diffractive structure could be used without departing from the principles of the invention and may provide an advantage in some applications. In that case the depths would be integral multiples of 2pi, expressed by the equation:

$$\Delta z = m\lambda/\Delta N$$

where m is an integer. This is referred to as a multi-order diffractive ("MOD"). It can accommodate multiple wavelengths at high efficiency. It may be better solution theoretically in some cases, but is more critical to mold and can result in unwanted visual artifacts The specific mix of surface types (plano, spherical or aspheric) and Fresnel and diffractive parameters is very dependent on the application's requirements. For the example of FIG. 1d, a mix of spherical and aspheric surfaces was used for best balance between on-axis and off-axis resolution and geometric distortion.

The Fresnel and diffractive surfaces, which are very delicate, are placed on the internal surfaces of the doublet to protect them from ambient damage, as such surfaces are not easily cleaned even in a professional environment.

The diffractive structure should preferably be designed to achieve optimally uniform diffractive efficiency over the photopic response of the normal human eye. FIG. 3 shows the wavelength centering for best efficiency of the diffractive surface structure.

Figure 4:
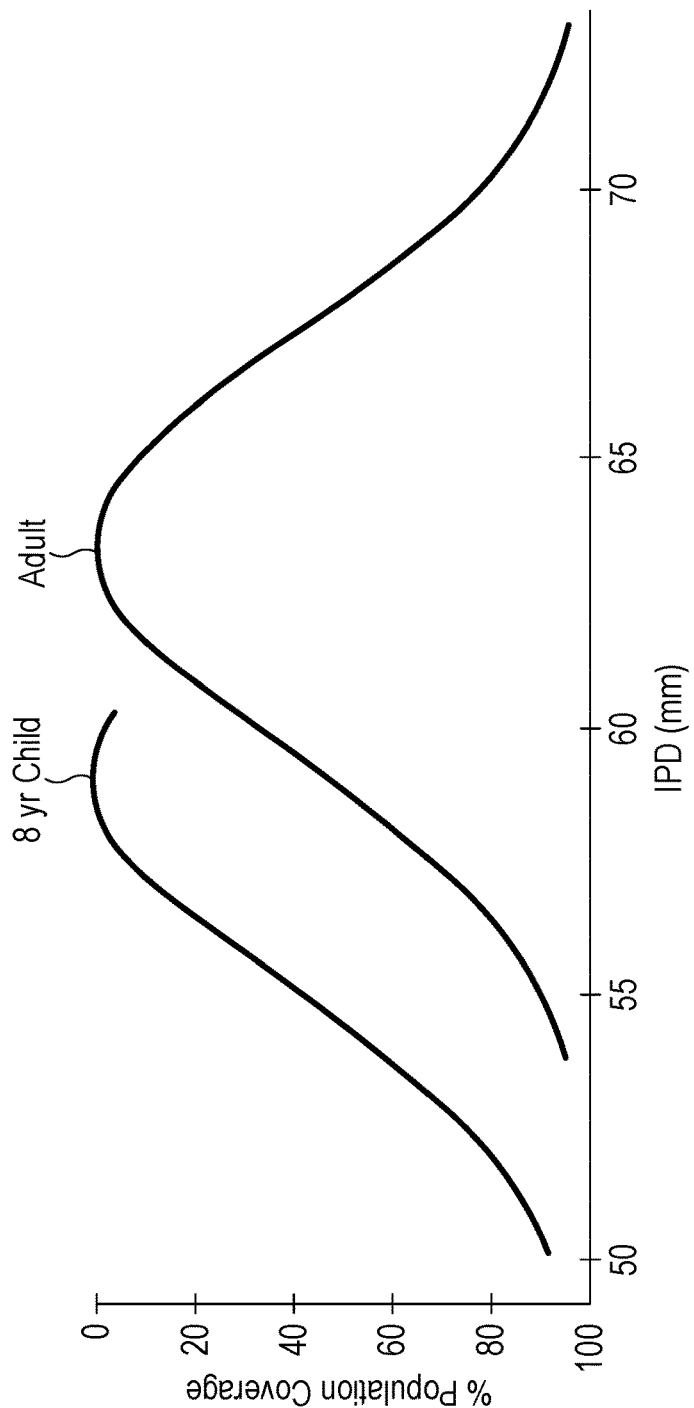
FIG. 4 defines the statistical distribution of interpupilary distance for child and adult populations.
Figure 5:
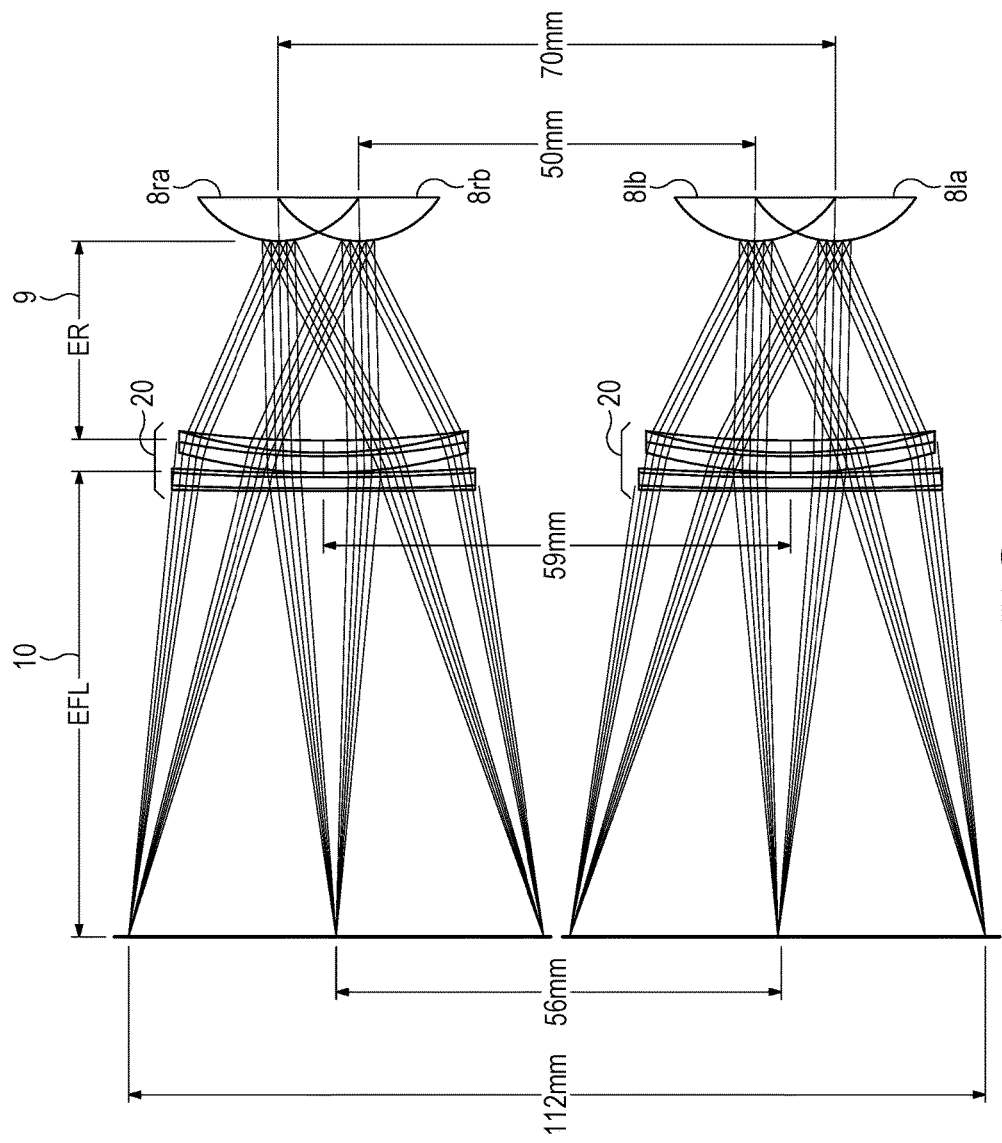
FIG. 5 details the relationship of interpupilary distance to the geometry of eyepieces and a smartphone display.

Another aspect of this invention is its ability to perform well with the eye pupil 10 significantly decentered relative to lens optical axis 22. Unlike thick lens performance where optical path lengths through the lens material vary significantly with axial displacement, the thin elements of this invention minimize path length differentials and resultant extreme aberrations. FIG. 4 and FIG. 5 illustrate the significance of this, especially in the application of a smartphone viewer.

FIG. 4 charts the distribution of the interpupilary distance 20 ("IPD") between eyes of the United States population of adults and children. Unlike traditional binocular microdisplay devices where the display device and its pre-aligned eyepiece lens can move together to accommodate the user's IPD, a smartphone's screen has a fixed width.

FIG. 5 illustrates viewing geometry for a side-by-side smartphone screen in landscape mode. Minimal eyestrain is especially important for long-term viewing. To accommodate both near-field viewing of text, for example, and far field viewing of content such as nature landscapes, the eyepieces are focused at a compromise virtual image distance of 4 feet (i.e., 1220 mm) by adjusting focal distance 10 to be slightly shorter than the lens' design focal length. To minimize eyestrain, the vergence angle between the two eyes should merge both right and left fields of view to be nearly coincident at the virtual image distance. This is determined by the lens effective focal length 10 and the difference between the half-screen width 24 and the lens separation 21. Graphic content is generally displayed across the full width 23 of the screen in landscape mode. The centers of vision for right-side 1R and left-side 1L graphic content are typically separated by the half-screen width 24. Theoretically, the width between the two adjacent images can be adjusted with an appropriate software application, but it cannot be done without compromising the full screen resolution and/or the field of view. And most available public-domain side-by-side content is configured for full screen viewing.

FIG. 5 further illustrates viewing geometries for two extremes of IPD, 20a at 50 mm and 20b at 70 mm, with corresponding left and right pupil positions 3aR, 3aL and 3bR, 3bL. The eyepieces approximately collimate any of the right and left ray bundles for delivery to the eye's pupils 3 and peripheral ray bundles 5bR and 5aL in conjunction with eye relief distance 9 determine the minimum required horizontal extent of the lens aperture to avoid image truncation. Further, the lens is required to deliver its design resolution and distortion goals for any of the ray bundles regardless of their axial and angular offsets with respect to lens center axis 22. Viewing angles for any field point on display screen 1 remain nearly constant for variations in IPD between 20a and 20b. In other words, lens separation 21 should be adjustable as determined by the smartphone's screen width 23 in order to maintain visual vergence angle at the intended virtual image distance; especially important for minimizing eyestrain for long-term viewing.

Figure 6A:
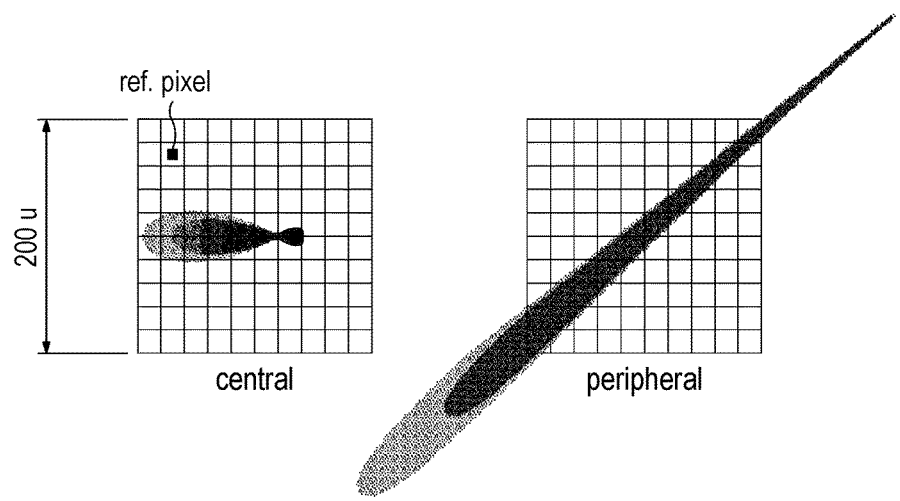
FIGS. 6A-6B illustrate the comparative on-axis and off-axis performances of a dual aspheric lens design vs. the lens design according to the principals of the present invention.
Figure 6B:
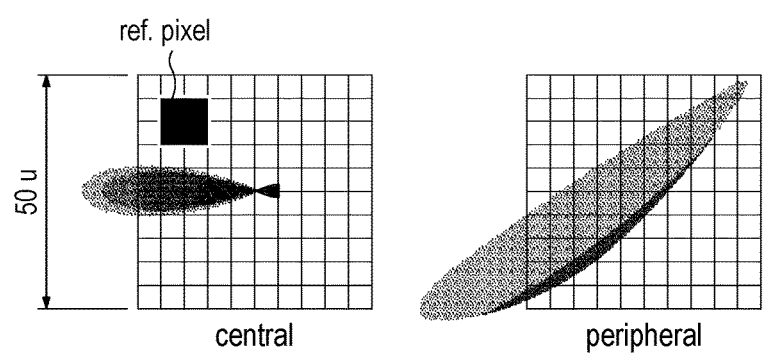

FIG. 6 shows retinal spot sizes for two designs, each 5 mm off-axis; the dual aspheric design of FIG. 1b and the doublet design of FIG. 1d according to the principles of the present invention. FIG. 6a illustrates spot sizes of the dual aspheric design on a 200 u scale for central rays 5 of FIG. 5 and peripheral rays 6. Note the reference pixel size, as explained for FIG. 1. This design offers marginal pixel-level modulation for central rays 5 and virtually no detectable modulation for peripheral rays 6. FIG. 6b illustrates spot sizes on a 50 u scale. This design offers good pixel-level modulation for central rays 5 and marginal modulation for peripheral rays 6. Overall, the lens design according to the principles of the present invention offers about four times better performance for off-axis resolution for central rays compared to an optimized aspheric design, and about eight times better performance for peripheral rays. Estimated cost of the doublet design of this invention is approximately 20% of that for the aspheric design. Weight is less than 50%.

Figure 7A:
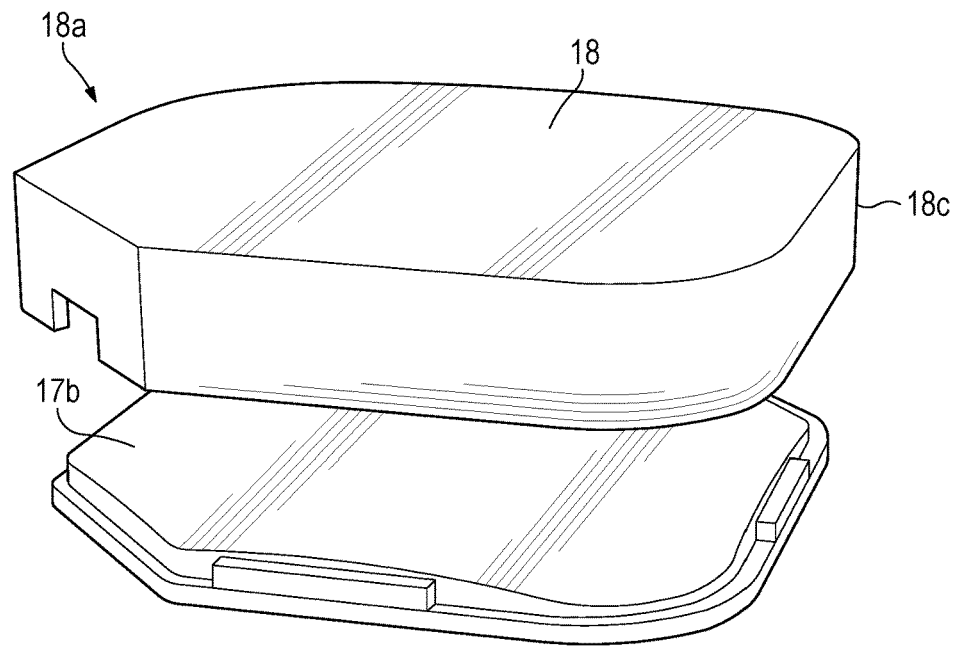
FIG. 7 shows a specific opto-mechanical configuration embodying the principles of this invention.
Figure 7B:
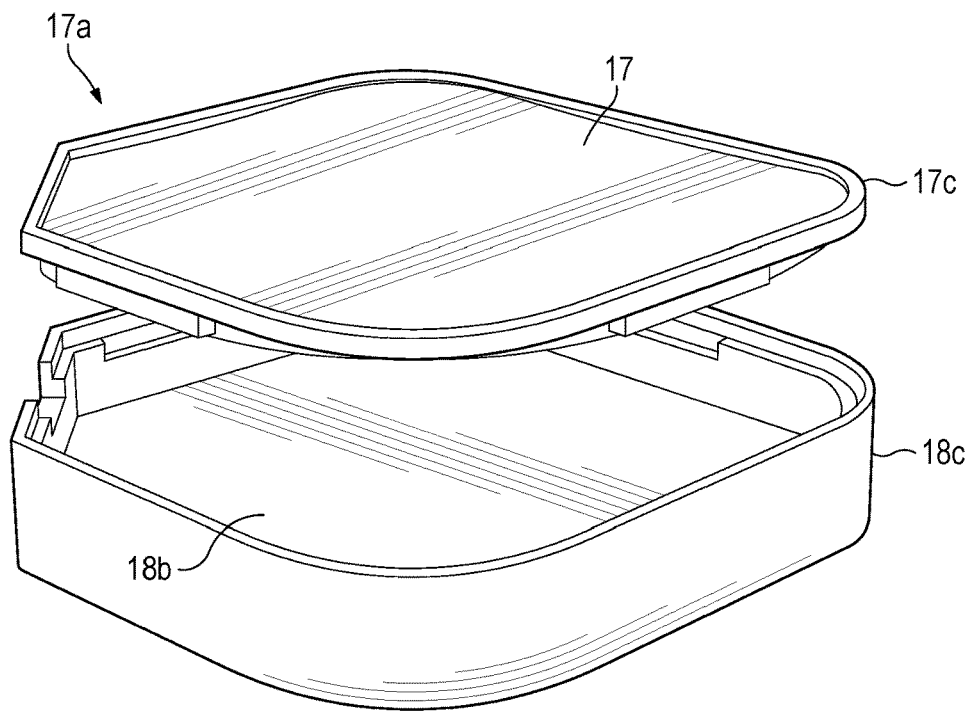

FIGS. 7a and 7b illustrate two different perspectives of an "as-molded" implementation of this invention. In both views a plastic molded second element 18a, having Fresnel surface 18b is equipped with a flange 18c for indexing the Fresnel and diffractive lenses to one another and internally isolating Fresnel surface 18a and diffractive surface 17a. Similarly, a molded plastic first lens element 17a, including diffractive surface 17b is provided with a mounting feature 17c which engages the flange 18c to assemble the achromatic doublet eyepiece of the present invention. The flange 18c and mounting feature 17c may be integral features of either lens element, or may separate components.

Design of a specific eyepiece lens according to the principles of the invention is preferably carried out using commercial lens design software, such as that offered under the trademark Zemax by Zemax, LLC.

An achromatic air-spaced doublet as described herein preferably offers, without limitation, at least the features and advantages of using lightweight, thin molded plastic to fabricate a continuous profile Fresnel surface; providing chromatic correction with a diffractive surface; maximizing contrast ratio by minimizing light obscuration and scattering by use of variable Fresnel surface draft angles; protecting delicate Fresnel and diffractive surfaces internal to the doublet so as to protect them from environmental damage; providing enhanced resolution and distortion performance improvements by superimposing the Fresnel and diffractive structures on refractive elements having aspheric base curvatures; producing acceptable geometric distortion limits without the need for software precompensation; providing an extraordinarily large field of view for an eyelens; maintaining performance over significant displacement of a viewer's pupil from the lens' center axis; accommodating variations in interpupilary distance (IPD) without adjustment; providing eye relief sufficient to clear user's prescription eyewear, thereby accommodating astigmatic vision; and, producing minimal eyestrain, thereby enabling long-term use.

The terms and expressions which have been employed on the foregoing specification are used therein as terms of description and not of limitation, and there is no intention, in the use of such terms and expressions, to exclude equivalents of the features show and described or portions thereof, it being recognized that the scope of the invention is defined and limited only by the claims that follow.

What is claimed is:

1. An eyepiece doublet lens, comprising:
   a first element having an optical axis and a diffractive structure comprising a plurality of diffraction facets formed on at least one surface of said first element for receiving light rays from an object and propagating those rays away from said first element; and
   a second element having essentially the same optical axis as the first element and being positioned to receive said rays from said first element, and having a Fresnel structure comprising a plurality of Fresnel facets formed on at least one surface of said second element, respective draft angles of said facets relative to the optical axis being proximate respective incidence angles of their respective adjacent incident light rays of a nominal design so as to minimize light obscuration, the diffractive structure of the first element being adapted to compensate for chromatic dispersion introduced by refractive properties of said first and second elements.

2. The lens of claim 1 wherein said optical axis defines an axial direction and said plurality of Fresnel facets have a constant pitch but variable depth in the axial direction.

3. The lens of claim 2 wherein a plurality of said Fresnel facets lie within a projected nominal diameter of the pupil of a human eye.

4. The lens of claim 2 wherein the Fresnel facets are aspherically curved.

5. The lens of claim 2 wherein said one surface of the second element is a spherical surface having said Fresnel structure superimposed thereon.

6. The lens of claim 2 wherein said one surface of the second element is an aspherical surface having said Fresnel structure superimposed thereon.

7. The lens of claim 1 wherein said optical axis defines an axial direction and a radial direction perpendicular to said axial direction, said one surface of the first element is curved and said diffractive structure comprises a plurality of diffraction facets having variable widths in the radial direction and a constant depth in the axial direction superimposed on said one surface of the first element so as to achieve selected facet-to-facet phase relationships.

8. The lens of claim 7 wherein the individual diffraction facets are curved and depths are selected in accordance with first-order diffraction theory.

9. The lens of claim 1 wherein said optical axis defines an axial direction and a radial direction perpendicular to said axial direction, said one surface of the second element is curved, said Fresnel structure is superimposed on said one surface of said second element, and said individual Fresnel facets have a constant pitch but variable depth in the axial direction, said one surface of the first element is curved, said diffraction facets have variable widths in the radial direction and a constant depth in the axial direction and are superimposed on said one surface of the first element.

10. The lens of claim 9 wherein said Fresnel surface of the second element faces said diffractive surface of said the first element.

11. The eyepiece doublet of claim 1, wherein said one Fresnel curved surface of said first element faces said diffractive curved surface of said second element.

12. The lens of claim 11 wherein there is space between said one surface of said first element and said one surface of said second element and said space is isolated.

13. The lens of claim 1, wherein the respective draft angles of said Fresnel facets relative to the optical axis are adapted to minimize scattering.

14. An eyepiece doublet lens, comprising:
   a first element having an optical axis and a predominantly diffractive structure comprising a plurality of diffraction facets formed on at least one surface of said first element; and
   a second element having essentially the same optical axis as the first element and a predominantly refractive structure comprising a plurality of Fresnel facets formed on at least one surface of said second element, the surface having the diffractive facets on the first element and the surface having the Fresnel facets on the second element facing one another.

15. The lens of claim 14 wherein there is space between said one surface of said first element and said one surface of said second element and said space is isolated from a user environment.

16. The lens of claim 14, wherein the diffractive facets of said first element have a fixed depth and variable pitch.

17. The lens of claim 14, wherein the diffractive facets are superimposed on a curved surface.

18. The lens of claim 14, wherein the Fresnel facets of said second element have a fixed pitch and variable depth.

19. The lens of claim 14, wherein the Fresnel facets are superimposed on a curved surface.

20. The lens of claim 14, wherein the diffractive facets of said first element have a fixed depth and variable pitch and are superimposed on a curved surface, and the Fresnel facets of said second element have a fixed pitch and variable depth and are superimposed on a curved surface.

21. The lens of claim 14 wherein there is space between said one surface of said first element and said one surface if said second element and said space is substantially surrounded laterally by a mechanical member so as to protect said diffractive and refractive structures.

* * * * *